United States Patent
Kwasny et al.

(10) Patent No.: US 8,206,184 B2
(45) Date of Patent: *Jun. 26, 2012

(54) CONNECTOR ASSEMBLY FOR VEHICLE CHARGING

(75) Inventors: Keith Kwasny, Northville, MI (US); Marc Poulin, Chesterfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/969,798

(22) Filed: Dec. 16, 2010

(65) Prior Publication Data

US 2012/0003861 A1    Jan. 5, 2012

Related U.S. Application Data

(63) Continuation of application No. 12/829,490, filed on Jul. 2, 2010, now Pat. No. 7,878,866.

(51) Int. Cl.
*H01R 13/502* (2006.01)
(52) U.S. Cl. ......... 439/695; 439/903; 439/923; 439/474
(58) Field of Classification Search .................. 439/474, 439/475, 589, 598, 599, 695, 903, 923
See application file for complete search history.

(56) References Cited

U.S. PATENT DOCUMENTS

| | | | |
|---|---|---|---|
| 4,109,989 A * | 8/1978 | Snyder et al. | ................. 439/140 |
| 4,669,791 A | 6/1987 | Savill | |
| 4,707,046 A | 11/1987 | Strand | |
| 5,080,600 A | 1/1992 | Baker et al. | |
| 5,344,330 A | 9/1994 | Hoffman | |
| 5,344,331 A | 9/1994 | Hoffman et al. | |
| 5,346,406 A | 9/1994 | Hoffman et al. | |
| 5,385,480 A | 1/1995 | Hoffman | |
| 5,478,250 A | 12/1995 | Hoffman | |
| 5,674,086 A | 10/1997 | Hashizawa et al. | |
| 5,676,560 A | 10/1997 | Endo et al. | |
| 5,751,135 A | 5/1998 | Fukushima et al. | |
| 5,816,643 A | 10/1998 | Itou et al. | |
| 5,906,500 A | 5/1999 | Kakuta et al. | |
| 6,203,354 B1 | 3/2001 | Kuwahara et al. | |
| 6,511,341 B1 | 1/2003 | Finona et al. | |
| 7,052,282 B2 | 5/2006 | Meleck et al. | |
| 7,878,866 B1 * | 2/2011 | Kwasny et al. | ................ 439/695 |

OTHER PUBLICATIONS

SAE International, Surface Vehicle Recommended Practice, "SAE Electric Vehicle and Plug in Hybrid Electric Vehicle Conductive Charge Coupler," Aug. 2006, 51 pages.

* cited by examiner

*Primary Examiner* — Tho D Ta
(74) *Attorney, Agent, or Firm* — Brooks Kushman P.C.

(57) ABSTRACT

A connector assembly is provided with a support structure having an elongate shape and an inlet for receiving a charging cable. A fitting is disposed in mechanical interlocking engagement with a distal end of the support structure for interconnecting the support structure with a vehicle charging receptacle. The support structure and the fitting are configured for disconnecting from each other when the connector assembly is subjected to a lateral load above a predetermined threshold value.

16 Claims, 4 Drawing Sheets

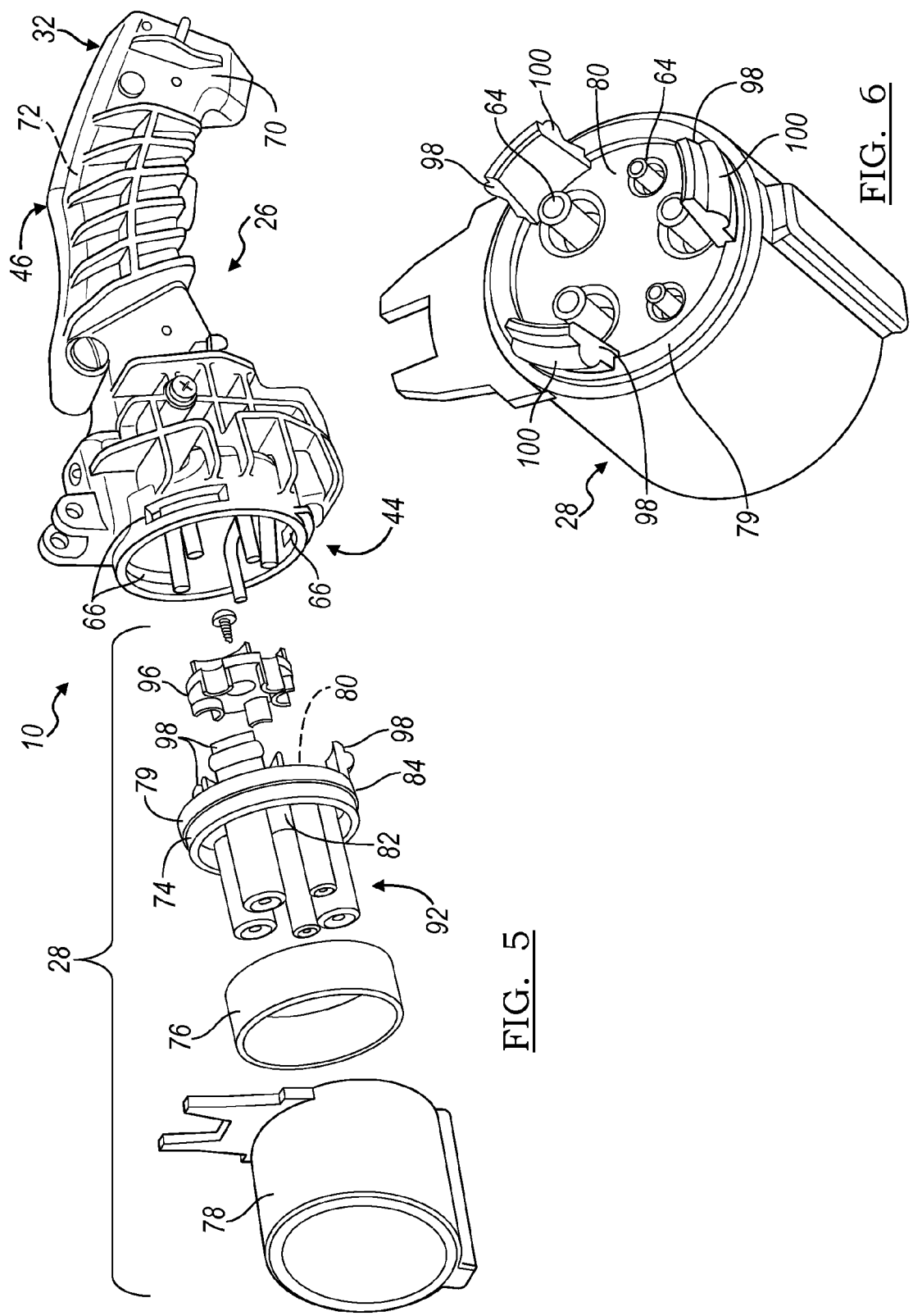

CONNECTOR ASSEMBLY FOR VEHICLE CHARGING

This application is a continuation of U.S. application Ser. No. 12/829,490 filed Jul. 2, 2010, and issued as U.S. Pat. No. 7,878,866 on Feb. 1, 2011, the disclosure of which is incorporated in its entirety by reference herein.

TECHNICAL FIELD

One or more embodiments relate to a connector assembly for facilitating the electrical charging of a vehicle.

BACKGROUND

Electric vehicles and many hybrid vehicles include a receptacle that is electrically connected to a vehicle battery. The receptacle receives an electrical connector that is coupled to a power supply for charging the vehicle battery.

BRIEF DESCRIPTION OF THE DRAWINGS

FIG. 5 is an exploded side perspective view of the connector assembly of FIG. 2;

FIG. 6 is a rear perspective view of a plug of the connector assembly of FIG. 2;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
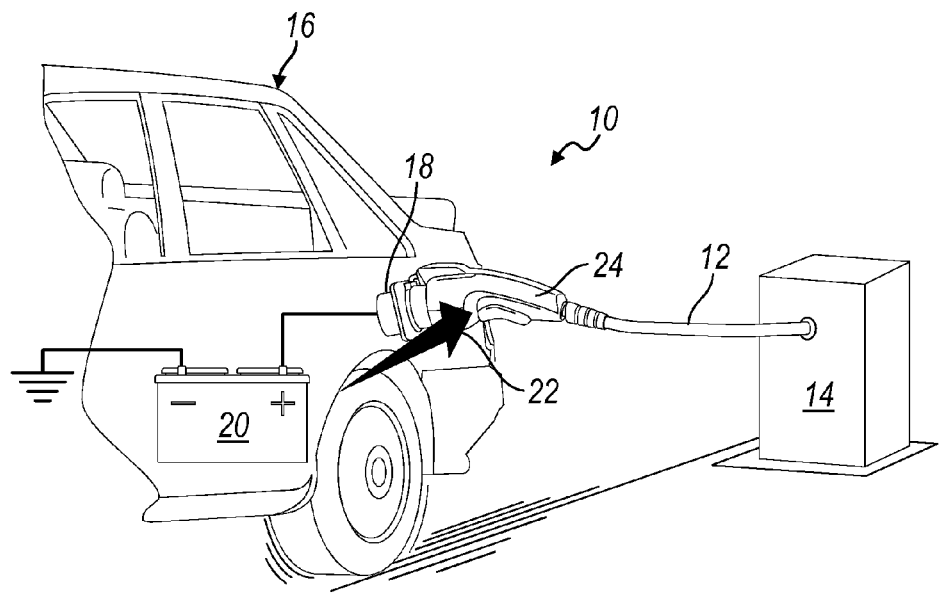
FIG. 1 is a schematic view of a connector assembly for electric vehicle charging according to at least one embodiment of the present invention.

With reference to FIG. 1, a connector assembly for facilitating the electric charging of a vehicle is illustrated in accordance with an embodiment and is generally referenced by numeral 10. In general, a connector assembly having a break-away feature is provided for releasably coupling an electrical power supply to a "plug-in" electric or hybrid vehicle.

The connector assembly 10 is coupled to a charging cable 12 and a power supply 14 for transferring electrical power. The connector assembly 10 is attached to the end of a charging cable 12. The charging cable 12 extends from the power supply 14. The power supply 14 represents an AC electrical power supply, such as a standard residential power circuit.

A "plug-in" electric or hybrid vehicle 16 is coupled to the power supply 14 for electrical charging. The vehicle 16 includes a vehicle charging receptacle 18 and a battery 20 for receiving electrical power. The vehicle charging receptacle 18 is mounted to be externally accessible from the vehicle 16. The vehicle charging receptacle 18 receives the connector assembly 10. The battery 20 is electrically connected to the charging receptacle 18 for storing electrical power. The vehicle 16 or the power supply 14 may also include a converter (not shown) for converting AC to DC electrical power for storage in the battery 20.

FIG. 1 depicts the vehicle 16 driving away from the power supply 14. Once the vehicle 16 has traveled far enough to remove any slack within the charging cable 12, tensile forces develop within the charging cable, which result in a transverse load 22 acting upon an intermediate portion of the connector assembly 10. This "drive away" event is provided for illustrative purposes, however other situations could result in such a transverse load 22 applied to the connector assembly 10. For example an individual could inadvertently walk into the assembly 10, or drop a heavy object on the assembly 10, while it is connected.

Figure 2:
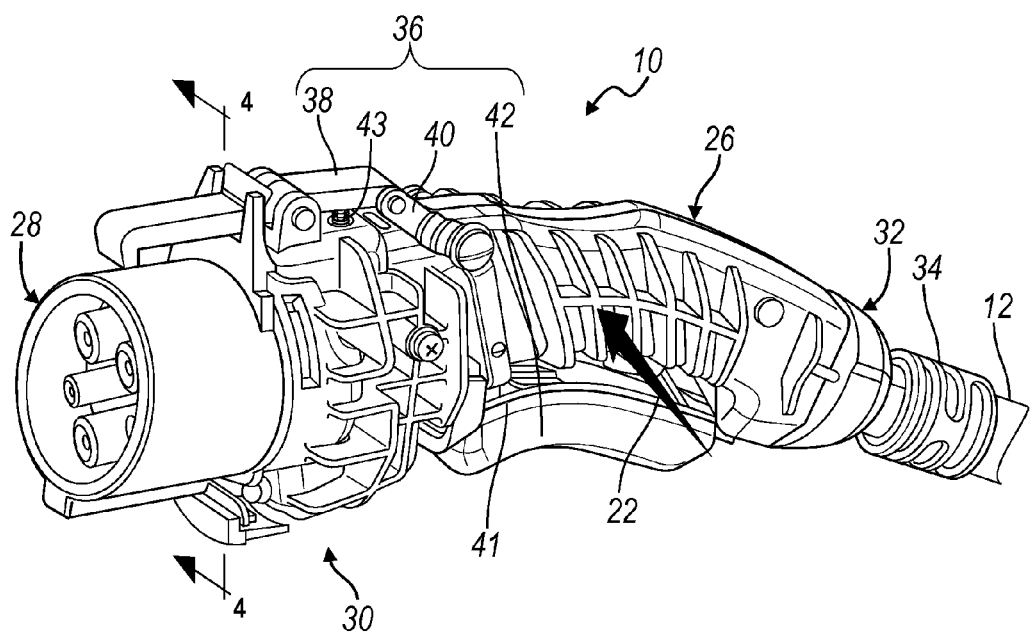
FIG. 2 is a side perspective view of the connector assembly of FIG. 1, illustrated partially disassembled.

FIG. 2 illustrates the connector assembly 10 of FIG. 1, without an outer shell 24. The outer shell 24 helps retain and enclose the components of the connector assembly 10.

The connector assembly 10 includes an elongate handle 26 and a plug 28 connected to each other for facilitating electrical charging of the vehicle 16. The connector assembly 10 includes a break-away feature 30 whereby the handle 26 disconnects from the plug 28 when the assembly 10 is subjected to a predetermined transverse load 22. By localizing damage to the connector assembly 10, the break-away feature 30 also minimizes damage to the vehicle 16 and the power supply 14 during transverse loading. Typically, damage to the vehicle 16 or power supply 14 is more expensive to repair, than damage to the connector assembly 10.

The handle 26 includes an inlet 32 for receiving the charging cable 12. The inlet 32 is formed at a proximal end of the handle 26, away from the plug 28. The charging cable 12 may include a flexible grommet 34 attached to an end of the cable 12 for providing strain relief and a seal between the cable 12 and the inlet 32.

The plug 28 engages the vehicle charging receptacle 18. An interface between the plug 28 and the vehicle charging receptacle 18 may be specified in an effort to standardize the connection throughout the electric vehicle industry. For example the Society of Automotive Engineers ("SAE") has specified such an interface in SAE-J1772, which is hereby incorporated by reference. However the connector assembly 10 is not limited by this SAE specification and may be utilized for applications specifying other interface requirements.

The connector assembly 10 includes a latching mechanism 36 for attaching the connector assembly 10 to the charging receptacle 18. The latching mechanism 36 is designed to maintain the electrical connection to the vehicle 16 while charging the battery 20. The latching mechanism 36 also prevents the connector assembly 10 from simply disconnecting from the vehicle 16 when a load is applied to the connector assembly 10.

The latching mechanism 36 includes a lever 38, a link 40 and a trigger 42 coupled to one another. The lever 38 is pivotally coupled to an upper portion of the handle 26. The link 40 is pivotally coupled to an intermediate portion of the handle 26. The link 40 is coupled to the lever 38 and pivots in an opposite direction as the lever 38. A lip 41 extends along an upper periphery of the trigger 42 for engaging the link 40. A compression spring 43 is provided for biasing the lever 38 in a latched position (as illustrated in FIG. 2). The spring 43 is located between a distal portion of the lever 38 and an upper portion of the handle 26.

By pulling the trigger 42 toward the handle 26, the lip 41 pivots the link 40 counter-clockwise, which in turn pivots the lever 38 clockwise and away from the plug 28. As the lever 38 pivots clockwise, it compresses the spring 43 and unlatches the connector assembly 10 from the vehicle receptacle 18. Once the trigger 42 is released, the spring 43 pivots the lever 38 back into the latched position. Thus the latching mechanism 36 allows a user to selectively attach the connector assembly 10 to the vehicle charging receptacle 18.

Figure 3:
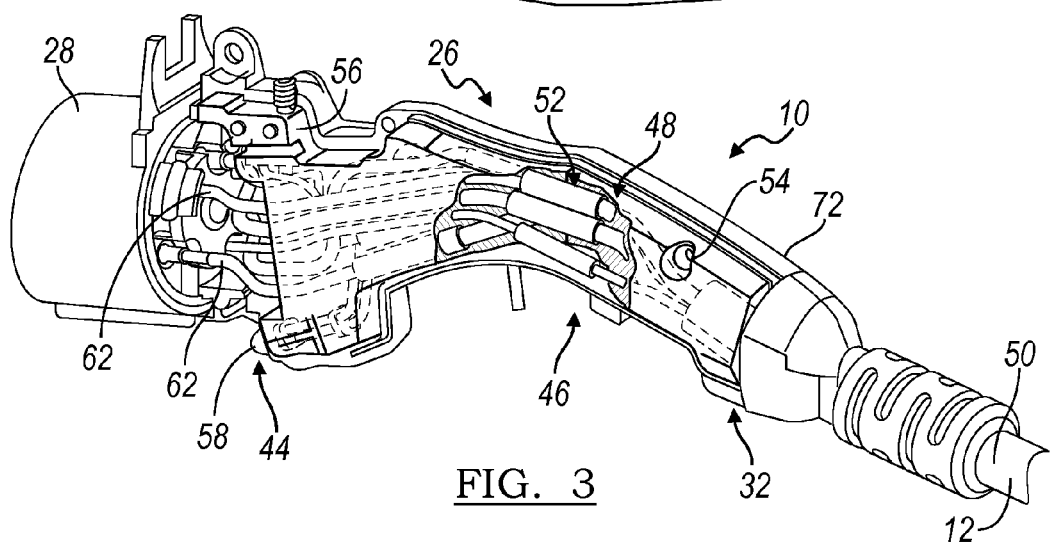
FIG. 3 is a side perspective view of the connector assembly of FIG. 2, illustrated further disassembled.

With reference to FIG. 3, the elongate handle 26 includes the inlet 32, an outlet 44 and a body 46 formed between the inlet 32 and outlet 44.

The body 46 forms a longitudinal internal cavity 48 for supporting the charging cable 12. The charging cable 12 includes a sheathing 50 formed around an electrical harness 52. The sheathing 50 insulates and protects the harness 52 along the length of the cable 12 outside of the connector assembly 10. The sheathing 50 ends at the inlet 32 of the handle 26 and the harness 52 extends along the internal cavity 48. The portion of the harness 52 located within the cavity 48 is encapsulated by a molded material 54 which is formed by a low-pressure molding process. In one embodiment the molded material 54 includes Macromelt® material by Henkel Corporation of Madison Heights, Mich. The molded material 54 helps insulate and seal the harness 52. Additional electronic components, such as a position sensor 56 and LED 58 may also be encapsulated within the body 46 by the molded material 54.

Figure 4:
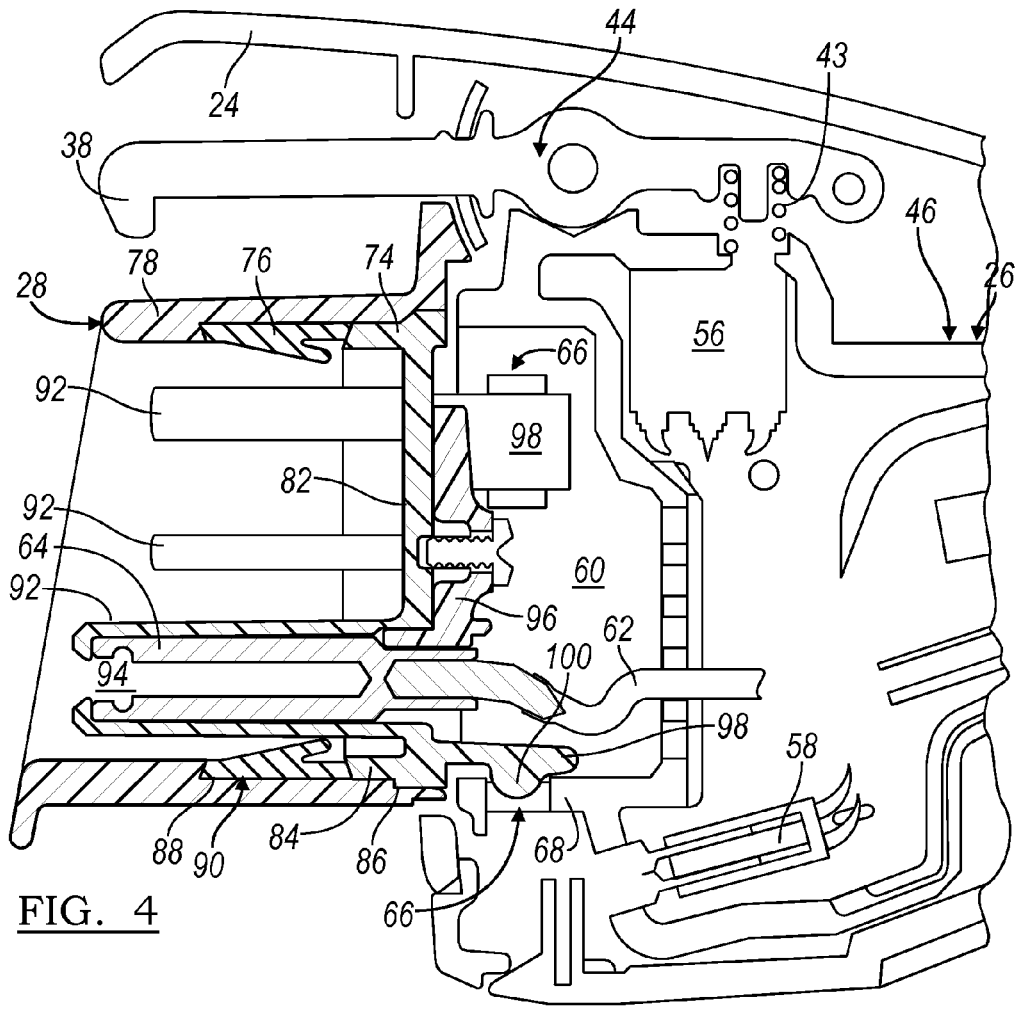
FIG. 4 is an enlarged partial section view of the connector assembly of FIG. 2 taken along section line 4-4.

Referring to FIGS. 3 and 4, the outlet 44 of the handle 26 forms a generally cylindrical pocket 60 that is longitudinally recessed toward the body 46. The pocket 60 encloses a free-length portion 62 of the electrical harness 52. For brevity, only one free-length portion 62 is illustrated in FIG. 4. A female wire terminal 64 is attached or soldered to the end of each free-length portion 62, and secured within the plug 28. The pocket 60 does not include any molded material 54, therefore the free-length portion 62 of the harness 52 is allowed some flexibility in movement.

The outlet 44 includes a series of slots 66 for attaching the handle 26 and the plug 28 to each other. The slots 66 are formed through an external wall 68 of the pocket 60. The illustrated embodiment includes an outlet 44 with three equally dimensioned slots 66, such that each slot 66 has a common length and width. Additionally, each slot 66 is equally spaced about a circumference of the outlet 44 at 120 degrees intervals. However, other embodiments of the connector assembly 10 contemplate more than three slots 66; slots 66 having differing dimensions with respect to one another; and irregular spacing between adjacent slots 66.

With reference to FIGS. 4-6, the handle 26 may be formed by a clamshell structure with a front portion 70 and a rear portion 72 attached to one another by transverse fasteners. Additionally an adhesive or gasket may be applied to an outer periphery of each portion 70 and 72 to seal the internal cavity 48.

The plug 28 includes a terminal cover 74, a wiper seal 76 and a shroud 78 coupled to one another for sealing the plug 28. The terminal cover 74 includes a disc-shaped base 79 with a first side surface 80 and a second side surface 82. The first side surface 80 is oriented adjacent to the outlet 44 of the handle 26 and opposite the second side surface 82. A ring 84 is formed along a circumference of the base 79 and longitudinally extends in opposing directions. The outer diameter of the ring 84 is stepped such that the portion of the ring that extends beyond the second side surface 82 has a smaller outer diameter that the portion of the ring 84 that extends beyond the first side surface 80. The wiper seal 76 is generally cylindrically shaped and positioned to abut the ring 84 adjacent to the second side surface 82.

The shroud 78 attaches to the terminal cover 74 to retain the seal 76. The shroud 78 is tubular and generally cylindrically shaped. The shroud 78 includes a recess 86 for receiving the stepped outer diameter of the cover 74. The recess 86 is formed along a proximal end of the inner diameter of the shroud 78 at a proximal end of the plug 28. The shroud 78 also includes a groove 88 formed along an intermediate portion of the inner diameter which extends to the recess 86. The groove 88 and the ring 84 collectively form a radial channel 90 for longitudinally retaining the seal 76 within the plug 28. In one embodiment the terminal cover 74 and shroud 78 are attached to each other by an ultrasonic weld at the interface between the recess 86 and the ring 84.

The terminal cover 74 secures the female terminals 64. A series of cylindrical terminal receptacles 92 extend transversely from the second side surface 82 of the plug 28. Each terminal receptacle 92 forms a terminal cavity 94 for receiving a female terminal 64. The connector assembly 10 may also include a back plate 96 that attaches to the first side surface 80 of the terminal cover 74 for retaining the female terminals 64, each within a terminal cavity 94. The illustrated embodiment of the connector assembly 10 depicts a five-terminal plug 28 that is designed according to the interface requirements of the SAE-J1772 specification.

The terminal cover 74 also includes a series of tabs 98 for attaching the plug 28 to the handle 26. The series of tabs 98 longitudinally extend from a peripheral edge of the base 79. The tabs 98 are aligned with the slots 66 and received into the pocket 60 of the handle 26. Each tab 98 is formed with a longitudinal length, a lateral curved width and a thickness. A transverse projection 100 is formed along the width of each tab 98. Each projection 100 extends radially outward from an intermediate portion of the length of the tab 98.

The projections 100 are sized for engaging a corresponding slot 66 with an interference fit. An interference fit ensures line contact at opposing sides of the slot 66 to distribute applied loads. As illustrated in FIG. 4, the projections 100 are formed with a rounded profile. In one embodiment, the projections 100 are formed with a two millimeter radius and the slots 66 are formed with a width less than four millimeters, for providing an interference fit.

Referring to FIG. 6, the illustrated embodiment includes three tabs 98, where each tab 98 is equally spaced about the circumference of the base 79. The tabs 98 may be spaced at 120 degree intervals, with one tab 98 oriented in a lower "6-o'clock" position. However, other embodiments of the connector assembly 10 contemplate more than three tabs 98; tabs 98 having differing dimensions with respect to one another; and irregular spacing between adjacent tabs 98.

Figure 7:
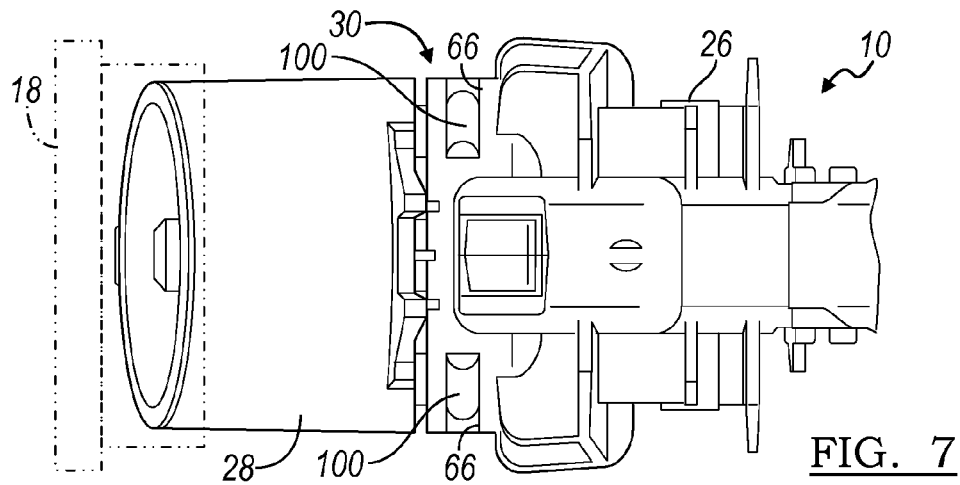
FIG. 7 is a top view of the connector assembly of FIG. 2, illustrated in an unloaded position.
Figure 8:
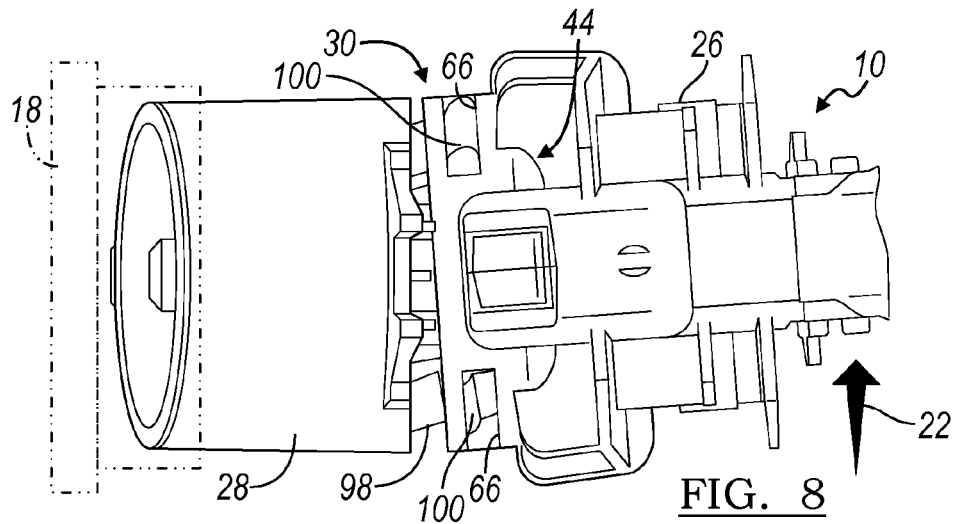
FIG. 8 is another top view of the connector assembly of FIG. 2, illustrated in a loaded position.
Figure 9:
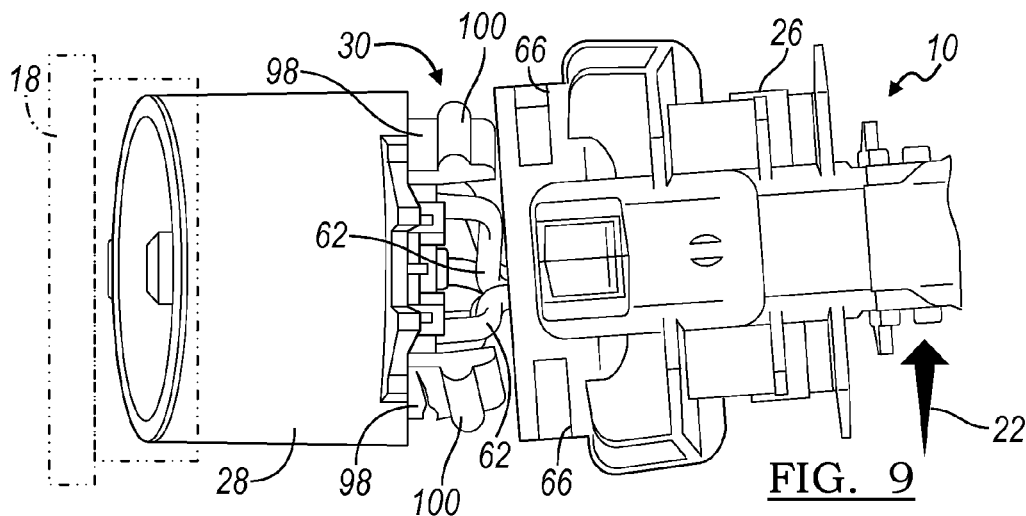
FIG. 9 is yet another top view of the connector assembly of FIG. 2, illustrated in another loaded position.

FIGS. 7-9 illustrate the break-away feature 30 of the connector assembly 10. The tabs 98 and the slots 66 are configured to provide a structural weak point for failure when the connector assembly 10 is subjected to a predetermined transverse load 22 applied to an intermediate portion of the assembly 10. The tabs 98 and slots 66 are designed to "fail" such that the handle 26 disconnects from the plug 28. Such failure may be achieved by plastic or elastic deformation of at least one of the tabs 98 and or the slots 66. In one embodiment the connector assembly 10 is configured as a frangible connector assembly 10 where the tabs 98 are configured to fracture when the assembly 10 is subjected to the predetermined load 22. Additionally, FIGS. 7-9, represent loading on the connector assembly 10 when the plug 28 is constrained by the charging receptacle 18 (illustrated in phantom).

FIG. 7 illustrates a top view of the connector assembly 10 in a connected and unloaded position. The handle 26 is connected to the plug 28 and each projection 100 is fully engaged with the corresponding slot 66. Additionally, the free-length portion of the harness (not shown) is partially compressed and flexible.

FIG. 8 illustrates a top view of the connector assembly 10 in a partially connected and loaded position. The transverse load 22 is applied to an intermediate portion of the handle 26. The tabs 98 elastically deform in the direction of the load 22, and the handle 26 pivots counterclockwise. Although the tabs 98 are deformed, the projections 100 still engage the slots 66.

FIG. 9 illustrates the connector assembly 10 in a disconnected and loaded position. As the tabs 98 deform beyond the positions illustrated in FIG. 8, the projections 100 disengage from the slots 66, and the handle 26 disconnects from the plug 28. FIG. 9 depicts an upper tab 98 that has elastically deformed and has returned to its original position, and a lower tab that has plastically deformed and fractured. Additionally, the free-length portion 62 of the harness has extended to allow the projections 100 to fully disengage the slots 66 for facilitating disconnection of the handle 26.

The break-away feature 30 may be designed to withstand a predetermined transverse load 22 applied to the connector assembly 10 before the handle 26 disconnects. The performance of the break-away feature 30 may be adjusted to accommodate different loading requirements by adjusting dimensions and material properties of the tabs 98 and slots 66.

For example, in one embodiment the connector assembly 10 is configured to break-away or fail when a transverse load between 160-300 Newtons is applied to an intermediate portion of the connector assembly 10. A minimum load requirement is necessary to prevent the connector assembly from failing during normal operating conditions. A maximum load requirement prevents damage being sustained by the power supply 14 or vehicle 16 during loading. To accommodate the 160-300 Newton load requirement, both the handle 26 and tabs 98 are molded from a nylon material such as Ultramid®, a Polyamide 6/6 from BASF of Wyandotte, Mich. Additionally, the tabs 98 are designed to have common dimensions with a thickness between 2-3 mm. Other embodiments of the connector assembly 10 contemplate the handle 26 and the tabs 98 being formed from other polymers such as polypropylene or acetal.

While embodiments of the invention are described above, it is not intended that these embodiments describe all possible forms of the invention. Rather, the words used in the specification are words of description rather than limitation, and various changes may be made without departing from the spirit and scope of the invention. Additionally, the features of various implementing embodiments may be combined to form further embodiments of the invention.

What is claimed:

1. A connector assembly comprising:
    a support structure having an elongate shape with an inlet for receiving a charging cable;
    a fitting disposed in mechanical interlocking engagement with a distal end of the support structure for interconnecting the support structure with a vehicle charging receptacle; at least one connecting member extending longitudinally from at least one of the fitting and the distal end of the support structure, wherein the other of the fitting and the distal end of the support structure includes an external wall with at least one aperture formed therethrough; and
    an enlarged portion extending radially from an intermediate portion of the connecting member, the enlarged portion being received by the aperture for connecting the fitting to the support structure;
    wherein the support structure and the fitting being configured for disconnecting from each other when the connector assembly is subjected to a lateral load above a predetermined threshold value.

2. The connector assembly of claim 1 wherein the at least one connecting member is formed of a flexible and elastic material, the at least one connecting member extending from a peripheral edge of at least one of the fitting and the distal end of the support structure.

3. The connector assembly of claim 1 wherein the fitting is configured for disconnecting from the support structure when the connector assembly is subjected to a generally perpendicular load above the predetermined threshold value.

4. The connector assembly of claim 1 wherein the fitting is configured for plastically deforming and disconnecting from the support structure when the connector assembly is subjected to a load above 160 Newtons.

5. The connector assembly of claim 1 wherein the at least one connecting member extends from the fitting for engaging the distal end of the support structure.

6. The connector assembly of claim 5 wherein the at least one connecting member further comprises at least two connecting members, each connecting member being equally spaced from one another about a circumference of the fitting.

7. The connector assembly of claim 6 wherein the distal end of the support structure includes the external wall, and wherein the at least one aperture further comprises at least two apertures formed therethrough, the at least two apertures being equally spaced from one another about a circumference of the distal end and each sized for receiving the enlarged portion of one of the connecting members extending from the fitting for connecting the fitting to the support structure.

8. The connector assembly of claim 1 wherein the support structure further comprises a clamshell support structure having a front portion, and a rear portion connected to the front portion about a peripheral edge to collectively form a cavity for enclosing a wire harness extending from the charging cable.

9. The connector assembly of claim 8 wherein the support structure is adapted to receive a molded material within the cavity for encapsulating and insulating a portion of the electrical harness.

10. The connector assembly of claim 9 further comprising an LED supported by at least one of the support structure and the fitting and connected to the electrical harness, wherein a portion of the LED is encapsulated by the molded material.

11. A connector assembly comprising:
    a support structure having an elongate shape; and
    a fitting disposed in mechanical interlocking engagement with a distal end of the support structure, the fitting having at least one connecting member extending longitudinally therefrom, and an enlarged portion extending radially from an intermediate portion of the connecting member for engaging the support structure;
    wherein the support structure is configured for disconnecting from the fitting when the connector assembly is subjected to a lateral load above a predetermined threshold value;
    wherein the support structure further comprises an external wall formed at the distal end, the external wall having at least one aperture formed therethrough for receiving the enlarged portion.

12. The connector assembly of claim 11 wherein the fitting is configured for plastically deforming and disconnecting from the support structure when the connector assembly is subjected to a load above 160 Newtons.

13. A system comprising:
- a charging cable for connecting to an external power supply; and
- a connector assembly attached to the charging cable, the connector assembly provided with:
  - a support structure having an elongate shape with an inlet for receiving a charging cable, and
  - a fitting disposed in mechanical interlocking engagement with a distal end of the support structure for interconnecting the support structure with a vehicle charging receptacle, the support structure and the fitting being configured for disconnecting from each other when the connector assembly is subjected to a lateral load above a predetermined threshold value,
  - an LED disposed within at least one of the support structure and the fitting for projecting light toward the vehicle charging receptacle; and
  - a lever pivotally connected to the support structure and extending longitudinally beyond the fitting, wherein the lever is actuated to selectively attach the connector assembly to the vehicle charging receptacle.

14. The system of claim 13 wherein the connector assembly further comprises at least one connecting member formed of a flexible material, the at least one connecting member extending longitudinally from a peripheral edge of at least one of the fitting and the distal end of the support structure for engaging the other of the fitting and the support structure.

15. The system of claim 13 wherein the support structure is configured for disconnecting from the fitting when the connector assembly is subjected to a generally perpendicular load above the predetermined threshold value.

16. The system of claim 13 wherein at least one of the fitting and the support structure is configured for plastically deforming and disconnecting from the other of the fitting and the support structure when the connector assembly is subjected to a load above 160 Newtons.

\* \* \* \* \*